United States Patent

Tanaka et al.

[11] Patent Number: 5,444,144
[45] Date of Patent: Aug. 22, 1995

[54] PROCESS FOR PRODUCING POLYETHYLENE TEREPHTHALATE

[75] Inventors: Katsuji Tanaka, Machida; Kazuyoshi Mino, Yokkaichi; Yuka Nakazima, Yokohama, all of Japan

[73] Assignee: Mitsubishi Chemical Corporation, Tokyo, Japan

[21] Appl. No.: 292,763

[22] Filed: Sep. 19, 1994

[30] Foreign Application Priority Data

Aug. 19, 1993 [JP] Japan .................................. 5-205383

[51] Int. Cl.[6] .............................................. C08J 3/00
[52] U.S. Cl. .................................... 528/503; 528/308.2; 528/308.4; 528/308.5; 528/499; 528/502 R
[58] Field of Search ............... 528/308.2, 308.4, 308.5, 528/499, 502, 503

[56] References Cited

U.S. PATENT DOCUMENTS 5,241,046  8/1993  Shiraki et al. .
5,262,513  11/1993  Tanaka et al. .
5,270,444  12/1993  Shiraki et al. .
5,302,686  4/1994  Tanaka et al. .

*Primary Examiner*—Samuel A. Acquah
*Attorney, Agent, or Firm*—Oblon, Spivak, McClelland, Maier & Neustadt

[57] ABSTRACT

A process for producing polyethylene terephthalate comprises the following steps ① and ②:

① a moisture conditioning step of contacting a polyethylene terephthalate having an intrinsic viscosity of from 0.5 to 1.5 dl/g, a density of at least 1.37 g/cm$^3$ and a cyclic trimer content of at most 5,000 ppm, with water to bring the water content of the polyethylene terephthalate to from 1,000 to 5,000 ppm, and ② a heat aging step of holding the moisture-conditioned polyethylene terephthalate obtained by the above moisture conditioning step, in a state where its water content is maintained at a level of at least 1,000 ppm.

6 Claims, No Drawings

PROCESS FOR PRODUCING POLYETHYLENE TEREPHTHALATE

BACKGROUND OF THE INVENTION

1. Field of the Invention

The present invention relates to a process for producing polyethylene terephthalate (hereinafter referred to as "PET") useful for molding bottles, films and sheets. More particularly, it relates to a process for producing PET whereby contamination of a mold scarcely occurs during its molding and the aldehyde content of the molded product will be little.

2. Discussion of Background

PET is excellent in the mechanical strength, chemical stability, transparency, sanitation and gas barrier property. Therefore, its use as containers for beverages such as soft drinks or fruit juices has been remarkable in recent years.

For example, in a case of a stretched bottle, such PET is molded into a preform for a hollow molded product by an injection molding machine, and this preform is then subjected to stretch blow molding in a mold having a predetermined shape. In a case of a bottle for a beverage such as a fruit juice beverage which requires hot filling, it is common to improve the heat resistance by applying heat treatment so-called heat setting.

However, conventional PET chips used for molding usually contain oligomers including a cyclic trimer as the main component. Such oligomers tend to deposit on e.g. the apparatus such as the mold, thus leading to contamination of the mold. Such contamination of the mold is likely to cause blushing or surface roughening of the molded bottles. Therefore, it used to be necessary to frequently clean the mold.

Further, a molded product obtained by molding conventional PET contained a substantial amount of acetaldehyde formed during the molding. Therefore, there was a problem that such acetaldehyde tended to migrate to the content of the molded product and adversely affected the taste or the odor.

In an attempt to solve such problems, there have been proposed a method for reducing the oligomers and aldehyde by subjecting a polyester prepolymer obtained by melt polymerization to solid-state polymerization under reduced pressure or under a stream of an inert gas (Japanese Unexamined Patent Publications No. 89330/1980 and No. 89331/1980), a method of subjecting a polyester prepolymer to moisture conditioning so that the water content will be at least 2,000 ppm, followed by crystallization and solid-state polymerization (Japanese Unexamined Patent Publication No. 219328/1984, a method of treating polyester particles with hot water of from 50° to 200° C., followed by heat treatment under reduced pressure or under a stream of an inert gas (Japanese Unexamined Patent Publication No. 55426/1981) and a method of applying extraction and cleaning treatments with water or an organic solvent before and after the solid-state polymerization (Japanese Unexamined Patent Publication No. 13715/1980). However, the oligomers and acetaldehyde have not adequately been reduced in the molded products prepared from polyester chips obtained by these methods.

Further, a method of treating PET with water of from 1° to 150° C. or with steam or a steam-containing gas has been proposed (Japanese Unexamined Patent Publication No. 215521/1991). However, such a method has problems that it is difficult to avoid reduction of the intrinsic viscosity of PET during the treatment or during a drying operation, and the heating cost required for drying tends to increase, or the productivity tends to be low, since the water content of PET after treatment is high.

SUMMARY OF THE INVENTION

It is an object of the present invention to provide a process for producing with good productivity PET which has a low oligomer content and produces a less amount of oligomers during the molding operation, whereby contamination of e.g. the mold scarcely occurs during the molding operation, and the amount of acetaldehyde produced during the molding operation is so small that it does not adversely affect the taste or the odor.

The present inventors have conducted extensive studies to accomplish the above object and as a result, have found it possible to accomplish the object by treating PET having a specific water content under specific conditions. The present invention has been accomplished on the basis of this discovery.

That is, the present invention provides a process for producing PET, which comprises the following steps ① and ②:

①  a moisture conditioning step of contacting a polyethylene terephthalate having an intrinsic viscosity of from 0.5 to 1.5 dl/g, a density of at least 1.37 g/cm$^3$ and a cyclic trimer content of at most 5,000 ppm, with water to bring the water content of the polyethylene terephthalate to from 1,000 to 5,000 ppm, and ② a heat aging step of holding the moisture-conditioned polyethylene terephthalate obtained by the above moisture conditioning step, in a state where its water content is maintained at a level of at least 1,000 ppm.

DETAILED DESCRIPTION OF THE PREFERRED EMBODIMENTS

Now, the present invention will be described in detail with reference to the preferred embodiments.

In the present invention, PET is a polyethylene terephthalate wherein the ratio of oxyethylene-oxyterephthaloyl units (hereinafter referred to as "ET units") to the total constituting repeating units is usually at least 80 equivalent %, and it may contain constituting repeating units other than the ET units within a range of at most 20 equivalent %. As the components constituting the repeating units other than terephthalic acid and ethylene glycol constituting the ET units, the carboxylic acids or their derivatives include, for example, phthalic acid, isophthalic acid, naphthalene dicarboxylic acid, 4,4'-diphenylsulfone dicarboxylic acid, 4,4'-biphenyl dicarboxylic acid, 1,4-cyclohexane dicarboxylic acid, 1,3-phenylenedioxydiacetic acid and their structural isomers, aliphatic dicarboxylic acids such as malonic acid, succinic acid and adipic acid as well as esters, oxyacids or derivatives of such dicarboxylic acids, such as p-hydroxybenzoic acid, esters of p-hydroxybenzoic acid and glycolic acid. As the diol component, an aliphatic glycol such as diethylene glycol, 1,2-propane diol, 1,3-propane diol, 1,4-butane diol, pentamethylene glycol, hexamethylene glycol or neopentyl glycol, an alicyclic glycol such as cyclohexane dimethanol, or an aromatic hydroxy compound derivative such as bisphenol A or bisphenol S, may, for example, be mentioned.

Among them, particularly preferred PET is PET wherein the ratio of the ET units is within a range of from 96.0 to 99.0 equivalent % and the ratio of 1,4,7-trioxaheptamethyleneterephthaloyl units (hereinafter referred to as "DT units") is within a range of from 1.0 to 4.0 equivalent %. Most preferred is PET wherein the ratio of the ET units is within a range of from 96.5 to 98.5 equivalent %, and the ratio of the DT units is within a range of from 1.5 to 3.5 equivalent %.

The intrinsic viscosity of PET to be used in the present invention is within a range of from 0.50 to 1.50 dl/g, preferably from 0.60 to 1.20 dl/g, more preferably from 0.70 to 1.00 dl/g, as measured at 30° C. in a mixed solvent of phenol/tetrachloroethane (weight ratio: 1/1). If the intrinsic viscosity is less than 0.50 dl/g, when a molded product is prepared from the resulting PET, the product tends to hardly have practically adequate strength. On the other hand, if it exceeds 1.50 dl/g, the melt viscosity tends to be too high, and the shearing heat generation in the molding machine during the injection or extrusion molding tends to be high, whereby formation of acetaldehyde tends to increase, such being undesirable.

The density of PET to be used in the present invention is at least 1 37 g/cm$^3$, preferably at least 1.38 g/cm$^3$, more preferably at least 1.39 g/cm$^3$, as measured at 25° C. by means of a density gradient tube employing a mixed solvent of carbon tetrachloride/n-heptane. If the density is less than 1.37 g/cm$^3$, the non-crystalline fraction in PET tends to be high, whereby the solid-state polymerization or heat treatment tends to be inadequate, and oligomers and acetaldehyde can not adequately be reduced.

The oligomer content in PET to be used in the present invention is at most 5,000 ppm, preferably at most 4,000 ppm, more preferably at most 3,500 ppm, most preferably at most 3,000 ppm, in terms of the content of a cyclic trimer as the main component of the oligomers. Generally, the smaller the content of the cyclic trimer, the better the prevention of contamination of the mold. If the content of the cyclic trimer exceeds 5,000 ppm, contamination of the mold tends to be distinctly observed.

PET to be used in the present invention contains metal atoms derived from a polycondensation catalyst incorporated at the time of its production. As such metal atoms, germanium, antimony, titanium and cobalt may be mentioned. As PET to be used in the present invention, particularly preferred is PET containing germanium as such metal atoms. The process of the present invention is particularly effective for PET containing germanium atoms as metal atoms derived from a polycondensation catalyst.

The above-mentioned PET to be used in the present invention can be produced with good productivity by conducting melt polymerization, followed by solid-state polymerization, in accordance with a conventional method.

Now, an example of the method for producing PET to be used in the present invention will specifically be described.

PET to be used in the present invention can be prepared from terephthalic acid or its ester-forming derivative and ethylene glycol or its ester-forming derivative as main starting materials. However, as mentioned above, other dicarboxylic acid components and/or other glycol components may be combined for use as starting materials.

The above-described starting materials comprising terephthalic acid or its ester-forming derivative and ethylene glycol or its ester-forming derivative are subjected to an esterification reaction or an ester exchange reaction in the presence of an esterification catalyst or an ester exchange catalyst to form bis($\beta$-hydroxyethyl)-terephthalate and/or its oligomer, which is then subjected to melt polycondensation at a high temperature under reduced pressure in the presence of a polycondensation catalyst and a stabilizer to obtain a prepolymer. The esterification catalyst may not be used, since terephthalic acid serves by itself as a self-catalyst for the esterification reaction, but the esterification can be conducted also in the coexistence of the after-mentioned polycondensation catalyst. Further, a small amount of an inorganic acid may also be used. As the ester exchange catalyst, a salt of an alkali metal such as sodium or lithium, a salt of an alkaline earth metal such as magnesium or calcium, or a compound of a metal such as zinc or manganese, may preferably be used. However, from the viewpoint of transparency, a manganese compound is particularly preferred.

As the polycondensation catalyst, compounds soluble in the reaction system, such as a germanium compound, an antimony compound, a titanium compound, a cobalt compound and a tin compound, may be used alone or in combination. However, germanium dioxide is particularly preferred from the viewpoint of the effects of the present invention as well as from the viewpoint of the color tone and transparency.

As the stabilizer, a phosphoric acid ester such as trimethyl phosphate, triethyl phosphate or triphenyl phosphate, phosphorous acid ester such as triphenyl phosphite or trisdodecyl phosphite, an acidic phosphoric acid ester such as methyl acid phosphate, dibutyl phosphate or monobutyl phosphate, or a phosphorus compound such as phosphoric acid, phosphorous acid, hypophosphorous acid or polyphosphoric acid, is preferred. Such catalyst and stabilizer may be used in the following proportions. Namely, in the case of the catalyst, it is used usually within a range of from 5 to 2,000 ppm, preferably from 10 to 500 ppm, by weight of the metal in the catalyst in the total polymerization material. In the case of the stabilizer, it is used usually within a range of from 10 to 1,000 ppm, preferably from 20 to 200 ppm, by weight of the phosphorus atom in the stabilizer. Such catalyst and stabilizer may be supplied at an optional stage during the preparation of the starting material slurry, during the esterification reaction or during the ester exchange reaction. Further, they may be supplied at the initial stage of the polycondensation reaction.

The prepolymer chips thus obtained preferably have an average particle size of from 2.0 to 5.5 mm, more preferably from 2.2 to 4.0 mm.

Then, the prepolymer chips thus obtained by melt polymerization, will be supplied to solid-state polymerization. The prepolymer chips to be supplied to the solid-state polymerization may be preliminarily heated at a temperature lower than the temperature for the solid-state polymerization to conduct preliminary crystallization and then supplied to the solid-state polymerization step. Such a preliminary crystallization step can be conducted by heating the prepolymer chips in a dried state usually at a temperature of from 120° to 200° C., preferably from 130° to 180° C. for from one minute to four hours, or by heating the chips in steam or in a steam-containing inert gas atmosphere usually at a temperature of from 120° to 200° C., preferably from 130° to 180° C., for at least one minute. Otherwise, it can be carried out by permitting the chips to absorb moisture in water, in steam or in a steam-containing inert gas atmosphere, and heating the moisture-conditioned prepolymer chips usually at a temperature of from 120° to 200° C., preferably from 130° to 180° C., for at least one minute. The moisture conditioning of the prepolymer chips is carried out so that the water content of the chips will be usually within a range of from 100 to 100,000 ppm, preferably from 1,000 to 5,000 ppm. By supplying the moisture-containing prepolymer chips to the crystallization step or the solid-state polymerization step, it is possible to further reduce the amount of acetaldehyde and the impurities contained in a small amount in PET in the present invention.

The solid-state polymerization step to which the above-mentioned prepolymer chips are supplied, comprises at least one stage, and the polymerization temperature is usually from 190° to 235° C., preferably from 195° to 230° C. In the case of an inert gas circulating method, it is carried out under a stream of an inert gas such as nitrogen, argon or carbon dioxide under such conditions that the pressure is usually from 1 kg/cm²G to 10 mmHg, preferably from 0.5 kg/cm²G to 100 mmHg. In the case of a reduced pressure method, it is carried out under such condition that the pressure is usually from 0.01 to 300 mmHg, preferably from 0.01 to 100 mmHg. The higher the temperature for the solid-state polymerization, the shorter the time until the desired physical properties can be attained. However, the solid-state polymerization time is usually from 1 to 50 hours, preferably from 5 to 30 hours, more preferably from 10 to 25 hours.

Now, the process for producing PET comprising the moisture conditioning step and the subsequent heat aging step of the present invention will be described in detail.

Firstly, with respect to the moisture conditioning step, PET chips to be supplied are as described above, and the chips are contacted with water so that the water content of the PET chips will be within a range of from 1,000 to 5,000 ppm, preferably from 1,500 to 4,000 ppm, more preferably from 2,000 to 3,500 ppm. If the water content of PET chips is less than 1,000 ppm, it tends to be difficult to obtain a molded product having small contents of oligomers and acetaldehyde. On the other hand, if the water content of PET chips exceeds 5,000 ppm, decrease of the intrinsic viscosity of PET due to hydrolysis during the moisture conditioning step and the subsequent heat aging step, tends to be substantial. Such is not only undesirable, but a long time and a large quantity of heat will be required for contacting PET chips with water or steam or a steam-containing gas until the water content of PET chips will exceed 5,000 ppm. Further, a long time and a large quantity of heat will be required for drying prior to the molding. Therefore, there will be a problem that the heating costs will increase, or the productivity will be low.

In a case where the moisture conditioning step is carried out by contacting the PET chips with steam or a steam-containing gas, such a step is carried out by contacting the PET chips usually with steam or a steam-containing gas having a relative humidity of from 40 to 100% and a temperature of from 20° to 100° C. for a time represented by the following formula:

$$2.0 \times 10^{-7} \times a \leq t \leq 9.8 \times 10^{-6} \times a$$

where
$a = \exp[\{6.3 \times 10^3/(T+273)\} - 4.2 \times 10^{-2} \times H]$
$t$: time (hr)
$T$: temperature (° C.)
$H$: relative humidity (%-RH).

Preferably, the PET chips are contacted with steam or a steam-containing gas having a relative humidity of from 60 to 100% and a temperature of from 30° to 80° C. for a time represented by the following formula:

$$6.0 \times 10^{-7} \times a \leq t \leq 5.9 \times 10^{-6} \times a$$

More preferably, the PET chips are contacted with steam or a steam-containing gas having a relative humidity of from 80 to 100% and a temperature of from 40° to 60° C. for a time represented by the following formula:

$$1.2 \times 10^{-6} \times a \leq t \leq 4.4 \times 10^{-6} a$$

In the case where the contact of PET chips with water is carried out by the above method under the above conditions, the decrease of the intrinsic viscosity of PET due to the hydrolysis during the moisture conditioning step and during the heat aging step, is negligible, and the difference in the water content between the inner and outer layers of PET chips is small, whereby the effects of treatment in the heat aging step will be remarkable, and the heating cost required in the moisture conditioning step is relatively small, such being very desirable.

In a case where the moisture conditioning step is carried out by contacting PET chips with liquid water, such a step is carried out by contacting the PET chips with water having a temperature of from 10° to 100° C. for a time represented by the following formula:

$$3.5 \times 10^{-10} \times b \leq t \leq 1.2 \times 10^{-8} \times b$$

where
$b = \exp\{7.0 \times 10^3/(T+273)\}$
$t$: time (hr)
$T$: temperature (° C.).

Preferably, the PET chips are contacted with water having a temperature of from 20° to 80° C. for a time represented by the following formula:

$$8.5 \times 10^{-10} \times b \leq t \leq 7.5 \times 10^{-9} \times b$$

More preferably, the moisture conditioning step is carried out by immersing PET chips in water having a temperature of from 40° to 60° C. for a time represented by the following formula:

$$1.6 \times 10^{-9} \times b \leq t \leq 5.6 \times 10^{-9} \times b$$

Further, the moisture conditioning step is preferably carried out so that $H_1$ calculated by the following formula be within a range of from 0.6 to 1.0, preferably from 0.8 to 1.0:

$$H_1 = \frac{\ln\{(D_1 - C_1)/(D_1 - A_1)\}}{\ln\{(D_1 - B_1)/(D_1 - A_1)\}}$$

$$D_1 = 11{,}000 \times (E/100)^3$$

where
- $A_1$: the cyclic trimer content (ppm) of the polyethylene terephthalate before the moisture conditioning,
- $B_1$: the cyclic trimer content (ppm) after the polyethylene terephthalate before the moisture conditioning was melted at 290° C. for 30 minutes,
- $C_1$: the cyclic trimer content (ppm) after the polyethylene terephthalate after the moisture conditioning was melted at 290° C. for 30 minutes,
- E: Ratio (equivalent %) of oxyethylene-oxyterephthaloyl units to the total constituting repeating units in the polyethylene terephthalate before the moisture conditioning.

When $H_1$ is within the above range, the decrease of the intrinsic viscosity due to the hydrolysis is negligible, and the effect of treatment in the subsequent heat aging step will be remarkable, and the heating cost required in the moisture conditioning step is relatively small.

The significance of the above formula for $H_1$ is as follows.

When PET obtained by solid-state polymerization, is melted, a cyclic trimer increases by the following reaction:

$$M_nX \underset{k'}{\overset{k}{\rightleftharpoons}} M_{n-3}X + CT$$

wherein M is a constituting repeating unit, X is a terminal group, CT is a cyclic trimer, and each of k and k' is a reaction rate constant.

From the above formula, the increasing rate of the cyclic trimer is represented by the following formula.

$$d[CT]/dt = k[M_nX] - k'[M_{n-3}X][CT]$$

When this formula is solved, the following formula will be obtained.

$$ln\{(D_1 - B_1)/(D_1 - A_1)\} = -k'_{F1}[M_{n-3}X]t$$

$$ln\{(D_1 - C_1)/(D_1 - A_1)\} = -k'_{G1}[M_{n-3}X]t$$

where
- $k'_{F1}$: the reverse reaction rate constant in the cyclic trimer-forming reaction when PET before treatment was melted at 290° C. for 30 minutes.
- $k'_{G1}$: the reverse reaction rate constant in the cyclic trimer-forming reaction when PET after the treatment was melted at 290° C. for 30 minutes.
- t: the melt treating time which is 30 minutes.

Namely, $H_1$ represents the ratio of the respective reverse reaction rate constants, and may be represented as follows:

$$H_1 = \frac{k'_{G1}}{k'_{F1}} = \frac{ln\{(D_1 - C_1)/(D_1 - A_1)\}}{ln\{(D_1 - B_1)/(D_1 - A_1)\}}$$

$H_2$ has a similar significance. $A_1$ and $A_2$, $D_1$ and $D_2$, and $E_1$ and $E_2$ have substantially the same values. Here, $D_1$ and $D_2$ represent the content of the cyclic trimer in an equilibrium condition at 290° C. As a result of an extensive study by the present inventors, it has been found that $D_1$ and $D_2$ have a good interrelation with the ET units. Namely, $D_1$ and $D_2$ are proportional to the cube of the proportion of the ET units.

The above-mentioned moisture conditioning step may be conducted either by a continuous system or by a batch system. Now, industrial methods will be exemplified, but the present invention is by no means restricted by such examples.

The batch system may, for example, be a method wherein PET chips are put into a silo type treating apparatus, and then water, or steam or a steam-containing gas is introduced thereinto to conduct the contact treatment, or a method wherein PET chips are put into a double cone type contact treating apparatus, and water or a steam-containing gas is introduced while rotating the apparatus, so that the contact treatment can be conducted more efficiently.

The continuous system may, for example, be a method wherein PET chips are continuously supplied from an upper portion of a silo type treating apparatus to which water, or a steam or a steam-containing gas can continuously be supplied, for contact treatment.

Further, these treatments may be conducted with mechanical stirring by means of e.g. stirring vanes, a rotary disk or a screw.

When contacted with water, PET chips obtained by such moisture conditioning treatment will be subjected to removal of water by a hydro-extracting apparatus such as a vibrating screen, a centrifugal separator or a centtle and then to air blowing to completely remove water from their surface, and then they will be supplied to the subsequent heat aging step. When contacted with steam or a steam-containing gas, PET chips can be supplied directly to the subsequent heat aging step as they are. In a case where the moisture conditioning is carried out either with water or with a steam-containing gas, PET chips may be maintained in an atmospheric air or in an inert gas atmosphere at room temperature for from a few minutes to a few days to bring the water content in the interior of the chips to be uniform, as the case requires.

Then, the moisture conditioned PET chips obtained by the above described method is supplied to the heat aging step. The heat aging step is carried out by subjecting the moisture conditioned PET chips to heat aging treatment so that the water content of the chips will be within a range of at least 1,000 ppm, preferably from 1,500 to 4,000 ppm, more preferably from 2,000 to 3,500 ppm.

The heat aging step is carried out by heating the moisture conditioned PET chips usually at a temperature of from 40° to 140° C. for from one minute to 50 hours, preferably at a temperature of from 50° to 120° C. for from two minutes to 30 hours, more preferably at a temperature of from 60° to 100° C. for from 3 minutes to 20 hours, most preferably at a temperature of from 70° to 90° C. for from 5 minutes to 10 hours.

Further, the heat aging step is carried out so that $H_2$ calculated by the following formula from the physical property values of PET before and after the heat aging treatment would be usually at most 0.7, preferably at most 0.6, most preferably at most 0.5:

$$H_2 = \frac{ln\{(D_2 - C_2)/(D_2 - A_2)\}}{ln\{(D_2 - B_2)/(D_2 - A_2)\}}$$

$$D_2 = 11,000 \times (E_2/100)^3$$

where
- $A_2$: the cyclic trimer content (ppm) of the polyethylene terephthalate before the heat aging, B₂: the cyclic trimer content (ppm) after the polyethylene terephthalate before the heat aging was melted at 290° C. for 30 minutes, C₂: the cyclic trimer content (ppm) after the polyethylene terephthalate after the heat aging was melted at 290° C. for 30 minutes, E₂: Ratio (equivalent %) of oxyethylene oxyterephthaloyl units to the total constituting repeating units in the polyethylene terephthalate before the heat aging.

If H₂ is at most 0.7, it is easy to obtain a molded product having little contents of oligomers and acetaldehyde.

The heat aging treatment of the present invention may be conducted either by a continuous system or by a batch system. Now, industrial methods will be exemplified, but the present invention is by no means restricted to such specific examples.

The batch system may, for example, be a method in which the moisture conditioned PET chips heated to a predetermined temperature are put into a silo type treating apparatus kept at a predetermined temperature to conduct heat treatment, or a method wherein the moisture conditioned PET chips are put into a double cone type treating apparatus, and heat treatment is conducted more efficiently while rotating the apparatus.

The continuous system may, for example, be a method wherein the moisture conditioned PET chips heated to a predetermined temperature are continuously supplied to a silo type heating apparatus from the upper portion thereof to conduct heat treatment.

The heating of the moisture-conditioned PET chips can be carried out efficiently by means of rotary disk type heating or microwave heating. Further, such treatment can be carried out more efficiently by conducting it with mechanical stirring by means of stirring vanes, a rotary disk or a screw.

Then, PET chips obtained by the heat aging step is usually supplied to a drying step, whereby the water content is reduced to less than 1,000 ppm. By drying the PET chips to the water content of 1,000 ppm, drying prior to the molding can be completed in a short period of time, whereby the productivity will be improved.

The heat-aged PET chips can be dried by means of a conventional apparatus. A batch system may, for example, be a method wherein the PET chips are put into a double cone type treating apparatus, and drying is conducted under vacuum or by supplying a dry gas while rotating the apparatus. A continuous system may, for example, be a method wherein the PET chips are continuously supplied to a silo type apparatus from its upper portion, and a dry gas is supplied from its lower portion. Further, for an efficient drying method, a dryer of a rotary disk type heating system or a dryer of a microwave heating system may be employed. Such drying can more efficiently be carried out by conducting it with mechanical stirring by means of stirring vanes or a screw. As the dry gas, dry nitrogen or dried air may, for example, be employed.

PET obtained by the process of the present invention can be formed into a film, a sheet, a container or other packaging materials by a melt molding method which is commonly used for conventional PET. Further, the mechanical strength of the PET can be improved by stretching it in at least monoaxial direction.

To produce a stretched film, a sheet formed from PET is subjected to stretching treatment, and a conventional apparatus commonly used for sheet forming or stretching treatment of PET, may be employed. Specifically, an unstretched sheet is firstly formed by e.g. extrusion molding or injection molding and continuously or separately, it is reheated for stretching treatment.

The stretching temperature may be set at a temperature commonly used for conventional PET. More specifically, the stretching temperature may be set within a range from the glass transition temperature and the temperature higher by 70° C. than the glass transition temperature, and it is usually set within a range of from 70° to 160° C., preferably from 90° to 140° C.

Stretching may be monoaxial or biaxial. However, biaxial stretching is usually preferred from the viewpoint of the practical physical properties of the film. The stretching ratio is usually within a range of from 1.1 to 10 times, preferably from 1.5 to 8 times, in the case of monoaxial stretching. In the case of biaxial stretching, the stretching ratio may usually be within a range of from 1.1 to 8 times, preferably from 1.5 to 5 times in each of the longitudinal and transverse directions. Further, the ratio of the stretching ratio in the longitudinal direction to the stretching ratio in the transverse direction is usually from 0.5 to 2, preferably from 0.7 to 1.3.

The stretched film thus obtained, may further be subjected to heat setting to improve the heat resistance and mechanical strength. The heat setting is carried out usually under tension at a temperature of from 120° C. to the melting point, preferably from 150° to 230° C. usually for from a few seconds to a few hours, preferably from a few tens seconds to a few minutes.

To produce a hollow molded product, the preform prepared from PET is subjected to stretch blow molding. For this purpose, a conventional apparatus commonly employed for blow molding of PET, can be employed. Specifically, a preform is first molded by e.g. injection molding or extrusion molding and subjected directly, or after processing the mouth portion and the bottom portion and reheating the processed preform, to a biaxially stretching blow molding method such as a hot parison method or a cold parison method.

The molding temperature of the preform, specifically the temperature of various parts of the cylinder and the nozzle or the die of the molding machine, is usually set within a range of from 270° to 290° C. With a view to suppressing thermal deterioration or the amount of by-product acetaldehyde to a low level, it is preferred to employ a temperature as low as possible within such a range that the transparency and the moldability of the resulting preform are good.

When the preform is subjected to biaxial stretch blow molding to form a hollow molded product, the stretching temperature may be set at a level commonly employed for conventional PET. More specifically, the stretching temperature may be set at a level between the glass transition temperature of PET and a temperature higher by 50° C. than the glass transition temperature, and it is usually set within a range of from 70° to 140° C., preferably from 90° to 120° C. The stretching ratio may be set usually within a range of from 1.5 to 3.5 times in the longitudinal direction and within a range of from 2 to 5 times in the circumferential direction.

A hollow molded product thus obtained, may be used as it is. However, especially for the content which requires hot filling such as a fruit juice beverage or Chinese tea, the hollow molded product is usually subjected to heat setting in the blow mold to impart heat resistance before use. The heat setting is conducted usually under tension by air pressure at a temperature of from 100° to 200° C., preferably from 120° to 180° C., for from a few seconds to a few hours, preferably from a few seconds to a few minutes.

Now, the present invention will be described in further detail with reference to Examples. However, it should be understood that the present invention is by no means restricted to such specific Examples. In the following Examples, "parts" means "parts by weight". Various measuring methods, treating methods and calculation methods used in the present invention are as follows.

Measuring methods (1) Intrinsic viscosity (hereinafter referred to as "IV")

Measured at 30° C. in phenol/tetrachloroethane (50/50 weight ratio).

(2) Water content

The moisture in chips were vaporized by a moisture vaporizer VA-21 Model (manufactured by Mitsubishi Kasei Corporation) at 250° C. under a nitrogen stream and quantitatibly analyzed by a trace amount moisture measuring apparatus CA-05 Model (manufactured by Mitsubishi Kasei Corporation).

(3) Amount of a cyclic trimer (hereinafter referred to as "CT amount")

200 mg of a PET sample was dissolved in 2 ml of a liquid mixture of chloroform/hexafluoroisopropanol (volume ratio: 3/2) and further diluted by an addition of 20 ml of chloroform. To this solution, 10 ml of methanol was added to reprecipitate the sample, followed by filtration to obtain a filtrate. The filtrate was evaporated to dryness, and the residue was dissolved in 25 ml of dimethylformamide. With respect to the solution thus obtained, the amount of a cyclic trimer was quantitatively analyzed by liquid chromatography.

(4) Density

Measured by a density gradient tube (carbon tetrachloride/n-heptane).

(5) Amount of diethylene glycol (hereinafter referred to as "DEG amount")

A sample was subjected to hydrolysis by a usual method, and the resulting diol component was quantitatively analyzed by gas chromatography.

(6) Haze

Measured by means of a color computer (HGM-2K Model), manufactured by Suga Shikenki K.K.

(7) Amount of acetalydehyde (hereinafter referred to as "AA amount")

A sample was extracted with water at 160° C. for two hours, whereupon acetaldehyde was quantitatively analyzed by gas chromatography.

Treating method (8) Melt treatment at 290° C. for 30 minutes 5 g of a sample PET was put into a glass container and vacuum-dried at 160° C. for two hours. Then, it was melted at 290° C. for 30 minutes in a nitrogen atmosphere under a normal pressure, and the molten PET was taken out and cooled at room temperature.

Calculation methods (9) Amount of oxyethyleneoxyterephthaloyl units (hereinafter referred to as "E amount")

Calculated as follows:

E amount = 100 − DEG amount (equivalent %)

(10) Increase of the total terminal groups (hereinafter referred to as "ΔTEV")

With respect to PET chips after the moisture conditioning/heat aging treatment, ΔTEV was calculated by the following formula:

$$\Delta TEV = 2{,}000{,}000 \times \{1359 \times (\text{IV after the heat aging treatment})\}^{-1.460} - 2{,}000{,}000 \times \{1359 \times (\text{IV before the moisture conditioning treatment})\}^{-1.460}$$

Further, with respect to a heat set bottle, ΔTEV was calculated by the following formula. (unit: eq/ton)

$$\Delta TEV = 2{,}000{,}000 \times \{1359 \times (\text{IV after the heat set bottle})\}^{-1.460} - 2{,}000{,}000 \times \{1359 \times (\text{IV before the moisture conditioning treatment})\}^{-1.460}$$

PREPARATION EXAMPLE 1

A starting material slurry comprising 12,680 parts of terephthalic acid, 5,630 parts of ethylene glycol and 60 parts by diethylene glycol, was prepared with stirring at a temperature of 50° C.

Then, to an esterification reactor having 300 parts of bis(2-hydroxyethyl)terephthalate preliminarily added and having the temperature and the pressure maintained at 260° C. and 0.60 kg/cm$^2$G, respectively, the above starting material slurry was supplied over a period of 250 minutes.

After completion of the supply, the reaction system was maintained for further 90 minutes under a pressure of 0.05 kg/cm$^2$G while maintaining the temperature at 260° C., to proceed the reaction, to conduct an esterification reaction for a total of 340 minutes.

Then, the entire amount in the esterification reactor was transferred to a polycondensation reactor preliminarily adjusted at 260° C. Then, 150 parts of a phosphoric acid ethylene glycol solution having a phosphorus atom concentration of 3,200 ppm, prepared by diluting a 85 wt % phosphoric acid aqueous solution with ethylene glycol, and 140 parts of an ethylene glycol solution of germanium catalyst (hereinafter referred to as "Ge catalyst solution" having a germanium atom concentration of 6,000 ppm, prepared by dissolving germanium dioxide in hot water, followed by solvent substitution with ethylene glycol, were added thereto. The esterification ratio of the esterified product at the time of addition of the Ge catalyst solution was 96.8 equivalent %.

After the addition of the Ge catalyst solution, the reaction system was stirred under atmospheric pressure for 10 minutes and then gradually heated from 260° C. to 280° C., and at the same time, the pressure was gradually reduced from atmospheric pressure and maintained at 0.5 mmHg. The reaction in the polycondensation reactor was carried out for 3 hours, whereupon the formed prepolymer was withdrawn in the form of strand from the outlet provided at the bottom of the polycondensation reactor, cooled by water and then cut into a chip form to obtain prepolymer chips. IV of the prepolymer chips was 0.58 dl/g.

Further, with respect to a half amount of the prepolymer chips, the surface was crystallized at 150° C. by an agitation crystallizing machine (Bepex Model), and then the chips were transferred to a static solid-state polymerization tower, dried at about 150° C. for 3 hours under a nitrogen stream of 20 l/kg/hr and then subjected to solid-state polymerization at 210° C. for 20 hours to obtain solid-state polymerized chips.

The analytical results of the solid-state polymerized chips are shown in Table 1.

PREPARATION EXAMPLE 2

Solid-state polymerization was conducted in the same manner as in Preparation Example 1 except that the remaining half amount of the prepolymer chips with IV of 0.58 dl/g prepared in Preparation Example 1 was used and the solid-state polymerization time was changed to 25 hours, to obtain solid-state polymerized chips.

The analytical results of the solid-state polymerized chips are shown in Table 1.

PREPARATION EXAMPLE 3

Prepolymer chips with IV of 0.60 were obtained in the same manner as in Preparation Example 1 except that diethylene glycol in the starting material slurry was changed to 40 parts, the incorporated Ge catalyst solution was changed to 120 parts, and the reaction in the polycondensation reactor was changed to 3.3 hours. The esterification ratio of the esterified reaction product at the time of adding the Ge catalyst solution was 95.5 equivalent %.

Using a half amount of the prepolymer chips, solid-state polymerization was conducted in the same manner as in Preparation Example 1 to obtain solid-state polymerized chips.

The analytical results of the solid-state polymerized chips are shown in Table 1.

EXAMPLE 1

100 parts of the solid-state polymerized chips prepared in Preparation Example 1 and 100 parts of deionized water were put into an autoclave adjusted to 80° C. and left to stand for one hour for moisture conditioning treatment. After the treatment, deionized water was withdrawn, and the solid-state polymerized chips were subjected to centrifugal separation and air blowing to remove water deposited on their surface, to obtain 100 parts of moisture-conditioned chips. The water content in the moisture-conditioned chips was 2,060 ppm, and the CT amount after melt treatment at 290° C. for 30 minutes was 8,130 ppm.

90 parts of the moisture-conditioned chips was put into an autoclave adjusted to 80° C., sealed and subjected to heat aging treatment for 9 hours with stirring at a rotational speed of 5 rpm. Then, a cooling medium was circulated to the jacket portion of the autoclave to cool the chips to room temperature over a period of 15 minutes, to obtain 90 parts of heat-aged chips.

The heat-aged chips had IV of 0.755 dl/g, a water content in the chips of 1,920 ppm and a CT amount after melt treatment at 290° C. for 30 minutes of 5,780 ppm.

In Table 2, the results after the moisture conditioning step and after the heat aging step and $\Delta$TEV representing the decomposition during the treatment are shown.

EXAMPLE 2

Using 100 parts of the solid-state polymerized chips as used in Example 1, moisture conditioning treatment was conducted in the same manner as in Example 1 except that the treatment was carried out at 45° C. for 27 hours, to obtain 100 parts of moisture-conditioned chips.

The water content in the moisture-conditioned chips was 3,830 ppm, and the CT amount after melt treatment at 290° C. for 30 minutes was 7,710 ppm.

Using 90 parts of the moisture-conditioned chips, heat aging treatment was conducted in the same manner as in Example 1 except that treating conditions were changed to 80° C. for 10 hours, to obtain 90 parts of heat-aged chips.

The heat-aged chips had IV of 0.751 dl/g, a water content in the chips of 3,790 ppm and a CT amount after the melt treatment at 290° C. for 30 minutes of 3,870 ppm.

In Table 2, the results after the moisture conditioning step and after the heat aging step and $\Delta$TEV representing the decomposition during the treatment are shown.

EXAMPLE 3

Using 100 parts of the solid-state polymerized chips prepared in Preparation Example 2, moisture conditioning treatment was conducted in the same manner as in Example 1 except that the treatment was carried out at 20° C. for 80 hours, to obtain 100 parts of moisture-conditioned chips. The water content of the moisture-conditioned chips was 2,980 ppm, and the CT amount after the melt treatment at 290° C. for 30 minutes was 8,190 ppm.

Using 90 parts of the moisture-conditioned chips, heat aging treatment was conducted in the same manner as in Example 1 except that the treating conditions were changed to 80° C. for 7 hours, to obtain 90 parts of heat-aged chips.

The heat-aged chips had IV of 0.780 dl/g, a water content in the chips of 2,920 ppm, and a CT amount after the melt treatment at 290° C. for 30 minutes of 3,680 ppm.

In Table 2, the results after the moisture conditioning step and after the heat aging step and $\Delta$TEV representing the decomposition during the treatment are shown.

EXAMPLE 4

Using 100 parts of solid-state polymerized chips prepared in Preparation Example 3, moisture conditioning treatment was conducted for 20 hours in a constant temperature and constant humidity tank set at 40° C. under a relative humidity of 60%, and the chips were withdrawn from the constant temperature and constant humidity tank to obtain 100 parts of moisture-conditioned chips.

The water content in the moisture-conditioned chips was 1,230 ppm, and the CT amount after the melt treatment at 290° C. for 30 minutes was 8,560 ppm.

Using 90 parts of the moisture-conditioned chips, heat aging treatment was conducted in the same manner as in Example 3, to obtain 90 parts of heat-aged chips.

The heat-aged chips had IV of 0.791 dl/g, a water content in the chips of 1,130 ppm, and a CT amount after the melt treatment at 290° C. for 30 minutes of 7,580 ppm.

In Table 2, the results after the moisture conditioning step and after the heat aging step and $\Delta$TEV representing the decomposition during the treatment are shown.

EXAMPLE 5

Using 100 parts of the solid-state polymerized chips as used in Example 3, moisture conditioning treatment was conducted in the same manner as in Example 4 except that the treatment was carried out at 75° C. under a relative humidity of 95% for two hours, to obtain 100 parts of moisture-conditioned chips.

The water content in the moisture-conditioned chips was 1,940 ppm, and the CT amount after the melt treatment at 290° C. for 30 minutes was 8,250 ppm.

Using 90 parts of the moisture-conditioned chips, heat aging treatment was conducted in the same manner as in Example 1 except that the treating conditions were changed to 70° C. for 10 hours, to obtain 90 parts of heat-aged chips.

The heat-aged chips had IV of 0.782 dl/g, a water content in the chips of 1,910 ppm, and a CT amount after the melt treatment at 290° C. for 30 minutes of 6,490 ppm.

In Table 2, the results after the moisture conditioning step and after the heat aging step, and ΔTEV representing the decomposition during the treatment are shown.

EXAMPLE 6

Using 100 parts of the solid-state polymerized chips as used in Example 3, moisture conditioning treatment was conducted in the same manner as in Example 1 except that the treatment was carried out at 50° C. for 8 hours, to obtain 100 parts of moisture-conditioned chips.

The water content of the moisture-conditioned chips was 2,570 ppm, and the CT amount after the melt treatment at 290° C. for 30 minutes was 8,110 ppm.

Using 90 parts of the moisture-conditioned chips, heat aging treatment was conducted in the same manner as in Example 1 except that the treating conditions were changed to 120° C. for 30 minutes, to obtain 90 parts of heat-aged chips.

The heat-aged chips had IV of 0.776 dl/g, a water content in the chips of 2,100 ppm, and a CT amount after the melt treatment at 290° C. for 30 minutes of 6,240 ppm.

In Table 2, the results after the moisture conditioning step and after the heat aging step, and ΔTEV representing the decomposition during the treatment are shown.

EXAMPLE 7

Using 100 parts of the solid-state polymerized chips as used in Example 3, moisture conditioning treatment was conducted in the same manner as in Example 4 except that the treatment was conducted at 60° C. under a relative humidity of 80% for 9 hours, to obtain 100 parts of moisture-conditioned chips.

The water content of the moisture-conditioned chips was 2,250 ppm, and the CT amount after the melt treatment at 290° C. for 30 minutes was 8,300 ppm.

90 parts of the moisture-conditioned chips were put into an autoclave adjusted to 95° C. and left to stand under atmospheric pressure in a nitrogen atmosphere to conduct heat aging for one hour. Then, a cooling medium was circulated to the jacket portion of the autoclave while stirring at a rotational speed of 5 rpm, to cool the chips to room temperature over a period of 15 minutes, to obtain 90 parts of heat-aged chips.

The heat-aged chips had IV of 0.778 dl/g, a water content in the chips of 1,500 ppm, and a CT amount after the melt treatment at 290° C. for 30 minutes of 7,210 ppm.

In Table 2, the results after the moisture conditioning step and after the heat aging step, and ΔTEV representing the decomposition during the treatment are shown.

EXAMPLE 8

Using 100 parts of the solid-state polymerized chips as used in Example 1, moisture conditioning treatment was conducted in the same manner as in Example 1 except that the treatment was carried out at 25° C. for 50 hours, to obtain 100 parts of moisture-conditioned chips.

The water content in the moisture-conditioned chips was 3,410 ppm, and the CT amount after the melt treatment at 290° C. for 30 minutes was 8,160 ppm.

Using 90 parts of the moisture-conditioned chips, heat aging treatment was conducted in the same manner as in Example 1 except that the treating conditions were changed to 90° C. for 4 hours, to obtain 90 parts of heat-aged chips.

The heat-aged chips had IV of 0.752 dl/g, a water content in the chips of 3,400 ppm, and a CT amount after the melt treatment at 290° C. for 30 minutes of 3,870 ppm.

In Table 2, the results after the moisture conditioning step and after the heat aging step, and ΔTEV representing the decomposition during the treatment are shown.

EXAMPLE 9

Using 100 parts of the solid-state polymerized chips as used in Example 4, moisture conditioning treatment was conducted in the same manner as in Example 4 except that the treatment was carried out at 60° C. under a relative humidity of 95% for 20 hours, to obtain 100 parts of moisture-conditioned chips.

The water content in the moisture-conditioned chips was 4,370 ppm, and the CT amount after the melt treatment at 290° C. for 30 minutes was 7,510 ppm.

Using 90 parts of the moisture-conditioned chips, heat aging treatment was conducted in the same manner as in Example 1 except that the treating conditions were changed to 110° C. for two hours, to obtain 90 parts of heat-aged chips.

The heat-aged chips had IV of 0.783 dl/g, a water content in the chips of 4,180 ppm, and a CT amount after the melt treatment at 290° C. for 30 minutes of 5,210 ppm.

In Table 2, the results after the moisture conditioning step and after the heat aging step, and ΔTEV representing the decomposition during the treatment are shown.

EXAMPLE 10

Using 100 parts of the solid-state polymerized chips as used in Example 1, moisture conditioning treatment was conducted in the same manner as in Example 4 except that the treatment was carried out at 70° C. under a relative humidity of 85% for 7 hours, to obtain 100 parts of moisture-conditioned chips.

The water content in the moisture-conditioned chips was 2,800 ppm, and the CT amount after the melt treatment at 290° C. for 30 minutes was 8,170 ppm.

Using 90 parts of the moisture-conditioned chips, heat aging treatment was conducted in the same manner as in Example 7 except that the treating conditions were changed to 60° C. for 20 hours, to obtain 90 parts of heat-aged chips.

The heat-aged chips had IV of 0.755 dl/g, a water content in the chips of 2,200 ppm, and a CT amount after the melt treatment at 290° C. for 30 minutes of 6,200 ppm.

In Table 2, the results after the moisture conditioning step and after the heat aging step, and ΔTEV representing the decomposition during the treatment are shown.

COMPARATIVE EXAMPLE 1

Using 100 parts of the solid-state polymerized chips as used in Example 3, moisture conditioning treatment was conducted in the same manner as in Example 5, to obtain 100 parts of moisture-conditioned chips.

The moisture-conditioned chips had IV of 0.783 dl/g, a water content in the chips of 1,940 ppm, and a CT amount after the melt treatment at 290° C. for 30 minutes of 8,240 ppm.

In Table 2, the results after the moisture conditioning step and ΔTEV representing the decomposition during the treatment are shown.

COMPARATIVE EXAMPLE 2

Using 100 parts of the solid-state polymerized chips as used in Example 1, moisture conditioning treatment was conducted in the same manner as in Example 3, to obtain 100 parts of moisture-conditioned chips.

The water-content of the moisture-conditioned chips was 1,550 ppm, and the CT amount after the melt treatment at 290° C. for 30 minutes was 8,200 ppm.

90 parts of the moisture-conditioned chips were put into a vacuum dryer adjusted to 150° C. and vacuum-dried for 5 hours, to obtain 90 parts of chips.

The chips had IV of 0.756 dl/g, a water content in the chips of 60 ppm, and a CT amount after the melt treatment at 290° C. for 30 minutes of 8,200 ppm.

In Table 2, the results after the moisture conditioning step and the heat aging step, and ΔTEV representing the decomposition during the treatment are shown.

COMPARATIVE EXAMPLE 3

Using 100 parts of the solid-state polymerized chips as used in Example 1, moisture conditioning treatment was conducted in the same manner as in Example 1 except that the treatment was carried out at 95° C. for 4 hours, to obtain 101 parts of moisture-conditioned chips.

The moisture-conditioned chips had IV of 0.743 dl/g, a water content in the chips of 6,210 ppm, and a CT amount after the melt treatment at 290° C. for 30 minutes of 4,220 ppm.

In Table 2, the results after the moisture conditioning step and ΔTEV representing the decomposition during the treatment are shown.

COMPARATIVE EXAMPLE 4

Using 100 parts of the solid-state polymerized chips as used in Example 1, moisture conditioning treatment was conducted in the same manner as in Example 1 except that the treatment was carried out at 95° C. for 16 hours, to obtain 101 parts of moisture-conditioned chips.

The moisture-conditioned chips had IV of 0.713 dl/g, a water content in the chips of 8,570 ppm, and a CT amount after the melt treatment at 290° C. for 30 minutes of 3,960 ppm.

In Table 2, the results after the moisture conditioning step and ΔTEV representing the decomposition during the treatment are shown.

COMPARATIVE EXAMPLE 5

Using 100 parts of the solid-state polymerized chips as used in Example 1, moisture conditioning treatment was conducted in the same manner as in Example 1 except that the treatment was carried out at 55° C. for 4 hours, to obtain 100 parts of moisture-conditioned chips.

The moisture-conditioned chips had IV of 0.758 dl/g, a water content in the chips of 2,240 ppm, and a CT amount after the melt treatment at 290° C. for 30 minutes of 8,130 ppm.

In Table 2, the results after the moisture conditioning step and ΔTEV representing the decomposition during the treatment are shown.

EXAMPLE 11

20 parts of the heat aged chips obtained in Example 1 were dried by a vacuum dryer of 160° C. for about 5 hours, and then preform was molded by an injection molding machine IS-60B Model, manufactured by Toshiba Corporation set for a temperature of various parts of the cylinder and the nozzle head of 280° C., a screw rotational speed of 100 rpm, an injection time of 10 seconds, and a mold quenching water temperature of 10° C. The mouth portion of this preform was heated and crystallized by an automatic crystallizing machine, and then the preform was heated and softened at a preheating furnace temperature of 135° C. for a preheating time of 18 seconds. Then, blow molding was carried out by means of a stretch blow molding machine set at a blow pressure of 20 kg/cm$^3$ as a blowing condition, to form a bottle having an average wall thickness of 300 μm at the barrel portion and an internal capacity of 1.5 l, followed by heat setting for 10 seconds under an air-pressure tension in the mold set at 150° C. As a continuous molding test, 1,000 bottles were continuously molded. In Table 3, the analytical results of the 1,000th heat set bottle are shown.

The mold after the continuous molding of 1,000 bottles was inspected, whereby no contamination of the mold was observed in each of the injection, blow molding and heat setting operations. All of the molded heat set bottles were excellent in transparency with little haze, and no problematic blushing was observed.

Further, in the heat set bottle, boiled water was filled at 95° C., then capped with a capper and stored at 55° C. for one week, whereupon an organoleptic test was carried out on the taste and odor by ten panelers who are engaged in the research in the field of foods at the central research of Mitsubishi Kasei Corporation, whereby no change was felt with respect to both the taste and odor.

EXAMPLES 12 TO 14

Using the heat aged chips obtained in each of Examples 2, 8 and 10, 1,000 heat set bottles were continuously molded in the same manner as in Example 11. In Table 3, the analytical results of the 1,000th heat set bottle are shown.

The mold after the continuous molding of 1,000 bottles was inspected, whereby no contamination of the mold was observed in each of the injection, blow molding and heat setting operations in each case. Further, in each case, all of 1,000 bottles were excellent in transparency with little haze, and no problematic blushing was observed.

Further, in the same manner as in Example 11, an organoleptic test was carried out, whereby in each case, no change was felt with respect to both the taste and odor.

COMPARATIVE EXAMPLES 6 TO 9

Using the heat aged chips obtained in each of Comparative Examples 2 to 5, 1,000 heat set bottles were continuously molded in the same manner as in Example 11. In Table 3, the analytical results of the 1,000th heat set bottle are shown.

The mold after the continuous molding of 1,000 bottles was inspected, whereby with respect to each of Comparative Examples 7 and 8, no contamination of the mold was observed in each of the injection, blow molding and heat setting operations, but with respect to each of Comparative Examples 6 and 9, contamination with white powder was observed.

Further, with all of the 1,000 heat set bottles obtained in each of Comparative Examples 7 and 8, a haze was observed, and the transparency was slightly poor. With respect to the heat set bottles obtained in each of Comparative Examples 6 and 9, a haze was observed from the 500th bottle, and white streaks were observed from the 800th bottle.

Further, in the same manner as in Example 11, an organoleptic test was carried out, whereby in each of Comparative Examples 7, 8, no change was felt with respect to both the taste and odor, but in each of Comparative Examples 6 and 9, changes in both the taste and odor were felt.

TABLE 1

| | IV (dl/g) | Density (g/cm³) | DEG amount (eq %) | E amount (eq %) | CT amount (ppm) | CT amount after melting at 290° C., for 30 min. (ppm) | AA amount (ppm) |
|---|---|---|---|---|---|---|---|
| Preparation Example 1 | 0.760 | 1.400 | 2.3 | 97.7 | 3110 | 8590 | 2.8 |
| Preparation Example 2 | 0.785 | 1.401 | 2.3 | 97.7 | 2700 | 8510 | 2.7 |
| Preparation Example 3 | 0.793 | 1.400 | 2.0 | 98.0 | 4100 | 8650 | 2.8 |

TABLE 2

| | Starting material PET[1] | Moisture conditioning step | | | Heat aging step | | | ΔTEV (eq/ton) |
|---|---|---|---|---|---|---|---|---|
| | | Water content (ppm) | CT amount after melting at 290° C. for 30 min | $H_1$ | Water content (ppm) | CT amount after melting at 290° C. for 30 min | $H_2$ | |
| Example 1 | ① | 2060 | 8130 | 0.83 | 1920 | 5780 | 0.39 | 0.8 |
| Example 2 | ① | 3830 | 7710 | 0.72 | 3790 | 3870 | 0.11 | 1.4 |
| Example 3 | ② | 2980 | 8190 | 0.89 | 2920 | 3680 | 0.11 | 0.7 |
| Example 4 | ③ | 1230 | 8560 | 0.96 | 1130 | 7580 | 0.66 | 0.3 |
| Example 5 | ② | 1940 | 8250 | 0.90 | 1910 | 6490 | 0.52 | 0.4 |
| Example 6 | ② | 2570 | 8110 | 0.86 | 2100 | 6240 | 0.50 | 1.3 |
| Example 7 | ② | 2250 | 8300 | 0.92 | 1500 | 7210 | 0.67 | 1.0 |
| Example 8 | ① | 3410 | 8160 | 0.85 | 3400 | 3870 | 0.09 | 1.2 |
| Example 9 | ③ | 4370 | 7510 | 0.61 | 4180 | 5210 | 0.24 | 1.5 |
| Example 10 | ① | 2800 | 8170 | 0.85 | 2200 | 6200 | 0.47 | 0.8 |
| Comparative Example 1 | ② | 1940 | 8240 | 0.90 | — | — | — | 0.2 |
| Comparative Example 2 | ① | 2980 | 8200 | 0.89 | 60 | 8200 | 1.00 | 0.5 |
| Comparative Example 3 | ① | 6210 | 4220 | 0.12 | — | — | — | 2.7 |
| Comparative Example 4 | ① | 8570 | 3960 | 0.09 | — | — | — | 7.8 |
| Comparative Example 5 | ① | 2240 | 8130 | 0.84 | — | — | — | 0.3 |

[1] Starting material PET
① PET produced by Preparation Example 1 (IV: 0.760, CT amount: 3110 ppm)
② PET produced by Preparation Example 2 (IV: 0.785, CT amount: 2740 ppm)
③ PET produced by Preparation Example 3 (IV: 0.793, CT amount: 4100 ppm)

TABLE 3

| | PET used for molding | Moisture conditioning step | | | | | Continuous molding test 2) | | |
|---|---|---|---|---|---|---|---|---|---|
| | | Haze (%) | Ct amount (ppm) | IV (dl/g) | ΔTEV[1] (eq/ton) | AA amount (ppm) | Effects to prevent contamination of a mold | Appearance of heat set bottles | Organoleptic test[3] Change in taste or odor |
| Example 11 | Example 1 | 0.4 | 3420 | 0.730 | 4.8 | 10.8 | ○ | ○ | ○ |
| Example 12 | Example 2 | 0.3 | 3220 | 0.725 | 5.7 | 9.7 | ○ | ○ | ○ |
| Example 13 | Example 8 | 0.3 | 3230 | 0.725 | 5.7 | 9.6 | ○ | ○ | ○ |
| Example 14 | Example 10 | 0.5 | 3500 | 0.729 | 5.0 | 11.2 | ○ | ○ | ○ |
| Comparative Example 6 | Comparative Example 2 | 2.0 | 3840 | 0.735 | 4.0 | 14.7 | X | X | X |
| Comparative Example 7 | Comparative Example 3 | 1.1 | 3290 | 0.710 | 8.3 | 9.8 | ○ | Δ | ○ |
| Comparative Example 8 | Comparative Example 4 | 1.3 | 3250 | 0.678 | 14.4 | 9.9 | ○ | Δ | ○ |
| Comparative Example 9 | Comparative Example 5 | 1.8 | 3790 | 0.732 | 4.5 | 14.0 | X | X | X |

[1] Total amount of terminal groups increased by the moisture conditioning, the heat aging and the molding.
2) Effects to prevent contamination of a mold: ○: Good, X: Poor
Appearance of heat set bottles: ○: No haze observed, Δ: Haze slightly observed, X: Haze distinctly observed
[3] Change in taste or odor: ○: No change, X: Positive change With PET obtained by the process of the present invention, oligomers such as a cyclic trimer which are usually likely to form during the molding, scarcely form, whereby it is possible to prevent contamination of the mold, and it is unnecessary to frequently clean the mold. Accordingly, it is possible to improve the productivity of molded products. Besides, it is possible to prevent blushing of the molded products.

Further, with PET obtained by the process of the present invention, the increase of acetaldehyde during the molding operation is little, and impurities which are usually contained in trace amounts in chips, are removed, whereby it is free from a bad odor or an abnormal smell which impairs the taste or fragrance of the content of the molded bottle.

By the process of the present invention, it is possible to produce such excellent PET very efficiently.

What is claimed is:

1. A process for producing polyethylene terephthalate comprising the following steps ① and ②:

① a moisture conditioning step of contacting a polyethylene terephthalate having an intrinsic viscosity of from 0.5 to 1.5 dl/g, a density of at least 1.37 g/cm³ and a cyclic trimer content of at most 5,000 ppm, with water to bring the water content of the polyethylene terephthalate to from 1,000 to 5,000 ppm, and ② a heat aging step of holding the moisture-conditioned polyethylene terephthalate obtained by the above moisture conditioning step, in a state where its water content is maintained at a level of at least 1,000 ppm.

2. A process for producing polyethylene terephthalate comprising the following steps ① to ③:

① a moisture conditioning step of contacting a polyethylene terephthalate having an intrinsic viscosity of from 0.5 to 1.5 dl/g, a density of at least 1.37 g/cm$^3$ and a cyclic trimer content of at most 5,000 ppm, with water to bring the water content of the polyethylene terephthalate to from 1,000 to 5,000 ppm, ② a heat aging step of holding the moisture-conditioned polyethylene terephthalate obtained by the above moisture conditioning step, in a state where its water content is maintained at a level of at least 1,000 ppm, and ③ a drying step of drying the polyethylene terephthalate obtained in the above heat aging step to reduce its water content to less than 1,000 ppm.

3. The process for producing polyethylene terephthalate according to claim 1, wherein the moisture conditioning step is carried out by contacting the polyethylene terephthalate with steam or a steam-containing gas having a relative humidity of from 40 to 100% and a temperature of from 20° to 100° C. for a time represented by the following formula:

$$2.0 \times 10^{-7} \times a \leq t \leq 9.8 \times 10^{-6} \times a$$

where
$a = \exp\{6.3 \times 10^3/(T+273)\} - 4.2 \times 10^{-2} \times H\}$
t: time (hr)
T: temperature (° C.)
H: relative humidity (%-RH).

4. The process for producing polyethylene terephthalate according to claim 1, wherein the moisture conditioning step is carried out by contacting the polyethylene terephthalate with water having a temperature of from 10° to 100° C. for a time represented by the following formula:

$$3.5 \times 10^{-10} \times b \leq t \leq 1.2 \times 10^{-8} \times b$$

where
$b = \exp\{7.0 \times 10^3/(T+273)\}$
t: time (hr)
T: temperature (° C).

5. The process for producing polyethylene terephthalate according to claim 1, wherein the moisture conditioning step is carried out so that $H_1$ calculated by the following formula be within a range of from 0.6 to 1.0:

$$H_1 = \frac{\ln\{(D_1 - C_1)/(D_1 - A_1)\}}{\ln\{(D_1 - B_1)/(D_1 - A_1)\}}$$

$$D_1 = 11,000 \times (E/100)^3$$

where
$A_1$: the cyclic trimer content (ppm) of the polyethylene terephthalate before the moisture conditioning,
$B_1$: the cyclic trimer content (ppm) after the polyethylene terephthalate before the moisture conditioning was melted at 290° C. for 30 minutes,
$C_1$: the cyclic trimer content (ppm) after the polyethylene terephthalate after the moisture conditioning was melted at 290° C. for 30 minutes,
E: Ratio (equivalent %) of oxyethylene oxyterephthaloyl units to the total constituting repeating units in the polyethylene terephthalate before the moisture conditioning.

6. The process for producing polyethylene terephthalate according to claim 1, wherein the heat aging step is carried out so that $H_2$ calculated by the following formula be at most 0.7:

$$H_2 = \frac{\ln\{(D_2 - C_2)/(D_2 - A_2)\}}{\ln\{(D_2 - B_2)/(D_2 - A_2)\}}$$

$$D_2 = 11,000 \times (E_2/100)^3$$

where
$A_2$: the cyclic trimer content (ppm) of the polyethylene terephthalate before the heat aging,
$B_2$: the cyclic trimer content (ppm) after the polyethylene terephthalate before the heat aging was melted at 290° C. for 30 minutes,
$C_2$: the cyclic trimer content (ppm) after the polyethylene terephthalate after the heat aging was melted at 290° C. for 30 minutes,
$E_2$: Ratio (equivalent %) of oxyethylene oxyterephthaloyl units to the total constituting repeating units in the polyethylene terephthalate before the heat aging.

* * * * *

UNITED STATES PATENT AND TRADEMARK OFFICE
CERTIFICATE OF CORRECTION

PATENT NO. : 5,444,144
DATED : August 22, 1995
INVENTOR(S) : Katsuji TANAKA, et al.

It is certified that error appears in the above-indentified patent and that said Letters Patent is hereby corrected as shown below:

On the title page, Item [22], the Filing Date should read:

--Aug. 19, 1994--

Signed and Sealed this

Fourteenth Day of November, 1995

Attest:

BRUCE LEHMAN

*Attesting Officer*     *Commissioner of Patents and Trademarks*